United States Patent
Taylor et al.

(10) Patent No.: US 7,125,826 B2
(45) Date of Patent: *Oct. 24, 2006

(54) METHODS OF USING INVERTIBLE OIL EXTERNAL-WATER INTERNAL FLUIDS IN SUBTERRANEAN APPLICATIONS

(75) Inventors: Robert S. Taylor, Red Deer (CA); David W. Ritter, Katy, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 279 days.

This patent is subject to a terminal disclaimer.

(21) Appl. No.: 10/454,092

(22) Filed: Jun. 3, 2003

(65) Prior Publication Data

US 2004/0023817 A1    Feb. 5, 2004

Related U.S. Application Data

(63) Continuation-in-part of application No. 09/952,410, filed on Sep. 14, 2001, now Pat. No. 6,608,006.

(51) Int. Cl.
    C09K 8/36    (2006.01)
    C09K 8/64    (2006.01)
    E21B 43/04   (2006.01)
    E21B 43/26   (2006.01)

(52) U.S. Cl. .................. 507/259; 507/239; 507/246; 507/277; 507/921; 507/922; 166/278; 166/308.4

(58) Field of Classification Search ............ 507/259, 507/239, 246, 277, 921, 922; 166/278, 308.4
    See application file for complete search history.

(56) References Cited

U.S. PATENT DOCUMENTS

| RE28,474 E | 7/1975 | Anderson et al. ........ 260/29.6 |
| 4,552,670 A | 11/1985 | Lipowski et al. ............ 252/8.5 |
| 5,905,061 A | 5/1999 | Patel .......................... 507/129 |
| 6,165,946 A | 12/2000 | Mueller et al. .............. 507/203 |
| 6,218,342 B1 | 4/2001 | Patel .......................... 507/129 |
| 6,608,006 B1 * | 8/2003 | Taylor et al. ................ 507/131 |
| 2001/0051593 A1 | 12/2001 | Patel .......................... 507/129 |
| 2002/0033258 A1 | 3/2002 | Patel .......................... 166/278 |
| 2004/0147404 A1 * | 7/2004 | Thaemlitz et al. .......... 507/100 |
| 2004/0259739 A1 * | 12/2004 | Monfreux-Gaillard et al. .. 507/117 |

FOREIGN PATENT DOCUMENTS

| WO | WO 98/05733 | 2/1998 |
| WO | WO 98/05735 | 2/1998 |

* cited by examiner

Primary Examiner—Philip C. Tucker
(74) Attorney, Agent, or Firm—Robert A. Kent; McAfee & Taft

(57) ABSTRACT

Methods of using invertible oil external-water internal emulsions in drilling, hydraulic fracturing, gravel packing and completion and then inverting the emulsion to a water external-oil internal emulsion are provided. The methods basically comprise the steps of contacting the oil external-water internal emulsion with an aqueous acid solution containing an anionic sulfonate surfactant for preventing aqueous acid solution-crude oil emulsions and crude oil sludging and a chemical for preventing the anionic sulfonate surfactant from reacting with the emulsifier in the oil external-water internal emulsion.

41 Claims, No Drawings

METHODS OF USING INVERTIBLE OIL EXTERNAL-WATER INTERNAL FLUIDS IN SUBTERRANEAN APPLICATIONS

CROSS-REFERENCE TO RELATED APPLICATION

The present application is a continuation-in-part of U.S. patent application Ser. No. 09/952,410 filed on Sep. 14, 2001, Entitled "Methods of Drilling Using Invertible Oil External-Water Internal Drilling Fluids", Now U.S. Pat. No. 6,608,006.

BACKGROUND OF THE INVENTION

1. Field of the Invention

The present invention relates to improved invertible oil external-water internal drilling fluids, methods for, inter alia, using invertible oil external-water internal drilling fluids as subterranean treatment fluids such as drilling fluids, completion fluids, work-over fluids, gravel packing fluids, fracturing fluids, a stimulating fluid, and packer fluids.

2. Description of the Related Art

Invertible oil external-water internal emulsion fluids have been used for, among other uses, drilling fluids, completion fluids, work-over fluids, gravel packing fluids, formation fracturing fluids, stimulating fluids, and packer fluids. When used as drilling fluids, such emulsion fluids lubricate the drill bit and reduce the overall time required for drilling well bores. The oil external-water internal emulsion fluids have heretofore been stabilized with nonionic amine emulsifiers and exhibit a relatively high pH to insure that the emulsifier retains a nonionic oil wetting character. Oil external-water internal emulsion fluids may be thought of as "stable" if the aqueous phase remains dispersed in the oil phase for at least about 1 minute after mixing of the components is ceased.

When the subterranean treatment, be it drilling, gravel packing, or any other similar treatment, is complete the oil external-water internal emulsion drilling fluid is contacted with an acid which protonates the nonionic amine emulsifier causing it to take on a cationic charge and increase in water solubility. The resulting water soluble emulsifier has water wetting properties, and as a result, the oil and water phases in the emulsion invert whereby a water external-oil internal emulsion of lower viscosity is formed.

The inverted, low-viscosity, water external-oil internal emulsion is believed to wet the surrounding producing formations, thereby increasing oil production. In addition, the water external-oil internal emulsion fluid may be easier to clean up whereby subsequent operations such as cementing or stimulation can be accomplished.

The acid utilized for contacting the oil external-water internal emulsion fluid and causing it to invert is generally in the form of an aqueous acid solution. In order to prevent the formation of aqueous acid solution-crude oil emulsions and crude oil sludging, the aqueous acid solutions used have heretofore contained anionic sulfonate surfactants. While the anionic sulfonate surfactants function well in preventing the formation of aqueous acid-crude oil emulsions and prevent oil sludging from taking place, it has been discovered that the anionic sulfonate surfactants react with the amine emulsifier after it is protonated by acid. The result of the reaction is that the emulsifier does not become water soluble and does not invert the oil external-water internal emulsion to a water external-oil internal emulsion. This not only prevents water wetting and faster clean up, but the aqueous acid solution utilized adds to the internal water phase of the emulsion which results in the emulsion significantly increasing in viscosity. The highly viscous oil external-water internal emulsion formed is difficult to remove and can cause damage to crude oil producing zones.

SUMMARY OF THE INVENTION

The present invention provides improved invertible oil external-water internal drilling fluids, methods for, inter alia, using invertible oil external-water internal drilling fluids as subterranean treatment fluids such as drilling fluids, completion fluids, work-over fluids, gravel packing fluids, fracturing fluids, a stimulating fluid, and packer fluids.

One embodiment of the present invention describe a method of treating subterranean formations comprising the steps of pumping a treatment fluid comprising an invertible oil external-water internal emulsion stabilized with a nonionic emulsifier into a subterranean formation, and then contacting that emulsion with an aqueous acid solution comprising an acid, an anionic sulfonate surfactant, and a chemical for preventing the anionic sulfonate surfactant from reacting with the nonionic emulsifier after the nonionic emulsifier is made cationic by the acid, and then substantially removing the inverted water external-oil internal emulsion from the subterranean formation. Such treatments may comprise fracturing treatments, gravel packing treatments, completion.

Other and further objects, features and advantages of the present invention will be readily apparent to those skilled in the art upon a reading of the description of preferred embodiments which follows.

DESCRIPTION OF PREFERRED EMBODIMENTS

Invertible oil external-water internal emulsion fluids stabilized with high pH nonionic emulsifiers may be used as subterranean treatment fluids. When the treatment, be it a fracturing treatment, a gravel packing treatment, a completion treatment, or any similar subterranean treatment, is completed, the oil external-water internal emulsion is contacted with an aqueous acid solution to substantially invert the emulsion, i.e., to form a lower viscosity water external-oil internal emulsion that may water wet the formation surfaces in the well bore and facilitate the clean up of the well bore.

In accordance with the present invention, the oil external-water internal emulsion fluid is contacted with an aqueous acid solution comprised of water, an acid, an anionic sulfonate surfactant for preventing the formation of aqueous acid solution-crude oil emulsions and crude oil sludging and a chemical for preventing the anionic sulfonate surfactant from reacting with the nonionic emulsifier after the emulsifier is made cationic by the acid. After the fluid has been inverted to a water external-oil internal emulsion, the emulsion is removed from the subterranean formation.

The chemical for preventing a reaction between the anionic sulfonate surfactant and the cationic emulsifier is preferably an ethoxylated rosin amine, an ethoxylated alkyl amine, or a combination thereof. The term "rosin amines" is used herein to mean hydroabietylamines. The term "alkyl amine" is used herein to mean alkylamines having from about 8 to about 20 or more carbons.

The oil used for forming the invertible oil external-water internal emulsion fluid includes, but is not limited to, olefins, kerosene, diesel oil, gas oil (also known as gas condensates), fuel oil and certain mixtures of crude oil. Of these, a mixture of internal olefins having in the range of from about 8 to about 24 carbon atoms is preferred. The water utilized in the emulsion can be brine, fresh water, or salt water, with calcium-containing brine being preferred. As mentioned, the emulsion is stabilized with a nonionic amine emulsifier, preferably an ethoxylated soya amine emulsifier. Optional components of the emulsion generally include caustic material such as lime, surfactants, and weighting materials. The various components of oil external-water internal emulsion fluids are well known to those skilled in the art as are the techniques for forming the emulsion fluids.

As mentioned above, upon the completion of using the oil external-water internal emulsion fluid, the fluid is contacted with an aqueous acid solution that causes it to substantially invert to a water external-oil internal emulsion. The aqueous acid solutions utilized have heretofore included strongly anionic sulfonate surfactants for preventing the formation of aqueous acid solution-crude oil emulsions in the well bore and crude oil sludging therein. Examples of such strongly anionic sulfonate surfactants include, but are not limited to, linear alkylbenzyl sulfonates, branched alkylbenzyl sulfonates, alkyl diphenyloxide disulfonates, alpha-olefin sulfonates, sulfosuccinates, and combinations thereof. While the anionic sulfonate surfactants successfully prevent the formation of aqueous acid solution-crude oil emulsions and crude oil sludging, it has been discovered that they often also prevent an oil external-water internal emulsion fluid from inverting whereby the emulsion increases in viscosity making it extremely difficult to remove from the well bore.

More specifically, it is believed that strongly anionic sulfonate surfactants react with the nonionic emulsifier after it has been protonated by the acid and becomes cationic and increases in water solubility. When the cationic emulsifier does not react with a strongly anionic sulfonate surfactant and remains water soluble, the oil external-water internal emulsion inverts and a water external-oil internal emulsion with water wetting properties is formed. However, as mentioned above, when the cationic emulsifier reacts with the strongly anionic sulfonate surfactant, the emulsifier becomes water insoluble and does not form a water external-oil internal emulsion. Instead, the emulsion remains oil wetting and water internal, and the aqueous acid solution adds to the internal water phase which results in a significant viscosity increase. The viscosity increase not only makes it difficult to remove the high viscosity oil external-water internal emulsion from the well bore, but the high viscosity emulsion can plug the porosity of producing formations penetrated by the well bore.

In accordance with the present invention, a chemical is included in the aqueous acid solution for preventing the anionic sulfonate surfactant therein from reacting with the nonionic emulsifier after the emulsifier is made cationic by the acid. Such a chemical may be an ethoxylated rosin amine, an ethoxylated alkyl amine, or a combination thereof. This in turn allows the cationic emulsifier to cause the oil external-water internal emulsion to substantially invert to a water external-oil internal emulsion. The aqueous acid solution combines with the external water phase of the emulsion that brings about a reduction in viscosity and facilitates an easy removal of the inverted emulsion from the well bore.

The ethoxylated rosin and alkyl amine chemicals for preventing the anionic sulfonate surfactant or surfactants in the aqueous acid solution from reacting with the nonionic emulsifier when contacted therewith are preferably hydroabietylamines ethoxylated with from about 2 to about 30 moles of ethylene oxide per mole and one or a mixture of alkylamines having from about 8 to about 20 or more carbon atoms and ethoxylated with from about 2 to about 30 moles of ethylene oxide per mole. Suitable commercially available hydroabietylamines which can be utilized include, but are not limited to, a mixture of 90% by weight hydroabietylamines ethoxylated with 11 moles of ethylene oxide per mole and 10% by weight non-ethoxylated hydroabietylamines which is commercially available from Hercules Inc. of Wilmington, Del. under the trade designation "POLYRAD 1110™"; 100% hydroabietylamines ethoxylated with 11 moles of ethylene oxide per mole commercially available from Hercules Inc. of Wilmington, Del. under the trade designation "POLYRAD 1110™"; a mixture of 85% by weight hydroabietylamines ethoxylated with 5 moles of ethylene oxide per mole and 15% by weight non-ethoxylated hydroabietylamines commercially available from Hercules Inc. of Wilmington, Del. under the trade name designation "POLYRAD 0515™"; and 100% hydroabietylamines ethoxylated with 5 moles of ethylene oxide per mole commercially available from Hercules Inc. of Wilmington, Del. under the trade designation "POLYRAD 0500™." A suitable commercially available mixture of alkylamines having from 8 to 18 alkyl carbon atoms and ethoxylated with 15 moles of ethylene oxide per mole is commercially available from Akzo Nobel Inc. of Chicago, Ill. under the trade designation "ETHOMEEN C-25™." Of the foregoing chemicals, "POLYRAD 1110™" is preferred.

The aqueous acid solution for contacting the oil external-water internal emulsion in accordance with this invention to bring about its inversion to a water external-oil internal emulsion while preventing the formation of aqueous acid solution-crude oil emulsion and crude oil sludging is basically comprised of water, an acid, an anionic sulfonate surfactant for preventing the formation of aqueous acid solution-crude oil emulsions and crude oil sludging and a chemical for preventing the anionic sulfonate surfactant from reacting with the emulsifier in the oil external-water internal emulsion.

As mentioned above, the acid in the aqueous acid solution may be an inorganic acid such as hydrochloric acid, an organic acid such as acetic, formic, glycolic acid, or combinations thereof. In some embodiment so of the present invention, the acid is hydrochloric acid. The acid should be present in an amount sufficient to substantially invert the oil external-water internal emulsion. In some embodiments, the acid and is included in the aqueous acid solution in an amount in the range of from about 1% to about 36% by weight of water in the solution, more preferably in an amount of about 10% to about 15%.

The anionic sulfonate surfactant may be a linear alkylbenzyl sulfonate such as a linear dodecylbenzenesulfonate or dodecylbenzenesulfonic acid, a branched alkylbenzyl sulfonate such as a branched dodecylbenzenesulfonate or dodecylbenzenesulfonic acid, an alkyl diphenyloxide disulfonate, an alpha-olefin sulfonate, a sulfosuccinate, or a combination thereof. In some embodiments, the anionic sulfonate surfactant is linear dodecylbenzenesulfonic acid. In some embodiments, the anionic sulfonate surfactant is included in the aqueous acid solution in an amount in the range of from about 0.1% to about 1.5% by weight of water therein, more preferably in an amount of about 0.4% to about 0.8%.

Finally, the chemical for preventing the anionic sulfonate surfactant from reacting with the nonionic emulsifier utilized in the oil external-water internal emulsion after the emulsifier is made cationic by the acid may be an ethoxylated rosin, alkyl amine, or a combination thereof. In some embodiments the chemical may be comprised of a mixture of 90% by weight hydroabietylamines ethoxylated with 11 moles of ethylene oxide per mole and 10% by weight non-ethoxylated hydroabietylamines, hydroabietylamines ethoxylated with 11 moles of ethylene oxide per mole, a mixture of 85% by weight hydroabietylamines ethoxylated with 5 moles of ethylene oxide per mole and 15% by weight non-ethoxylated hydroabietylamines, hydroabietylamines ethoxylated with 5 moles of ethylene oxide per mole, and a mixture of alkylamines having from about 8 carbon atoms to about 20 or more carbon atoms in the alkyl groups ethoxylated with from about 2 to about 30 moles of ethylene oxide per mole. The ethoxylated rosin or alkyl amines are generally included in the aqueous acid solution in an amount in the range of from about 0.1% to about 3.0% by weight of water therein, more preferably in an amount of about 0.5%.

One method of the present invention provides an improved method of treating a subterranean formation using an invertible oil external-water internal emulsion treatment fluid stabilized with a nonionic amine emulsifier. In the treatment methods of the present invention, the oil external-water internal fracturing fluid is placed into a subterranean formation and then the oil external-water internal emulsion treatment fluid is inverted and reduced in viscosity by contacting the emulsion treatment fluid with an aqueous acid solution. The aqueous acid solution is comprised of water, an acid, an anionic sulfonate surfactant, and one or more of the chemicals described above for preventing the anionic sulfonate surfactant from reacting with the amine emulsifier after the emulsifier is made cationic by the acid. Thereafter, the inverted water external-oil internal emulsion is removed from the subterranean formation.

Another method of the present invention provides a method of drilling a well bore penetrating one or more crude oil producing zones using an invertible oil external-water internal emulsion drilling fluid stabilized with a nonionic amine emulsifier. The well bore is drilled with the oil external-water internal drilling fluid after which the oil external-water internal emulsion drilling fluid is inverted and reduced in viscosity by contacting the emulsion drilling fluid with an aqueous acid solution. The aqueous acid solution is comprised of water, an acid, an anionic sulfonate surfactant, and one or more of the chemicals described above for preventing the anionic sulfonate surfactant from reacting with the amine emulsifier after the emulsifier is made cationic by the acid. Thereafter, the inverted water external-oil internal emulsion is removed from the well bore.

Another improved method of this invention for drilling a well bore penetrating one or more crude oil producing zones using an invertible oil external-water internal emulsion drilling fluid stabilized with a nonionic amine emulsifier and then inverting the drilling fluid to a water external-oil internal emulsion is comprised of the following steps: (a) drilling the well bore using the oil external-water internal emulsion drilling fluid; (b) preparing an aqueous acid solution comprised of water, hydrochloric acid, an anionic sulfonate surfactant for preventing the formation of aqueous acid solution-crude oil emulsions and crude oil sludging and a chemical for preventing the anionic sulfonate surfactant from reacting with the nonionic amine emulsifier; (c) contacting the oil external-water internal emulsion with the aqueous acid solution to thereby substantially invert the emulsion; and (d) removing the inverted water external-oil internal emulsion from the well bore.

Still another method of the present invention provides an improved method of hydraulic fracturing using an invertible oil external-water internal emulsion drilling fluid stabilized with a nonionic amine emulsifier. In the hydraulic fracturing methods of the present invention, the oil external-water internal fracturing fluid is injected into a subterranean formation at a pressure sufficient to form at least one fracture therein. In some embodiments, the oil external-water internal fracturing fluid may further comprise particulate matter, such as a proppant. Once at least one fracture is formed, the oil external-water internal emulsion fracturing fluid is inverted and reduced in viscosity by contacting the emulsion fracturing fluid with an aqueous acid solution. The aqueous acid solution is comprised of water, an acid, an anionic sulfonate surfactant, and one or more of the chemicals described above for preventing the anionic sulfonate surfactant from reacting with the amine emulsifier after the emulsifier is made cationic by the acid. Thereafter, the inverted water external-oil internal emulsion is removed from the subterranean formation.

Another method of the present invention provides an improved method of gravel packing using an invertible oil external-water internal emulsion fluid stabilized with a nonionic amine emulsifier. In the gravel packing methods of the present invention, a gravel pack composition comprising an invertible oil external-water internal emulsion delivery fluid and gravel particles are placed in a region of a well bore such that the gravel particles form a gravel pack substantially adjacent to the well bore and then the oil external-water internal emulsion delivery fluid remaining in the well bore is inverted and reduced in viscosity by contacting the emulsion delivery fluid with an aqueous acid solution. The aqueous acid solution is comprised of water, an acid, an anionic sulfonate surfactant, and one or more of the chemicals described above for preventing the anionic sulfonate surfactant from reacting with the amine emulsifier after the emulsifier is made cationic by the acid. Thereafter, the remaining inverted water external-oil internal emulsion is removed from the subterranean formation.

Another method of the present invention provides an improved completion fluid using an invertible oil external-water internal emulsion fluid stabilized with a nonionic amine emulsifier. In the use as a completion fluid of the present invention, a completion fluid composition comprising an invertible oil external-water internal emulsion is placed in a wellbore that may be either cased or open hole. The completion fluid is typically a fluid without solids that placed in the wellbore to provide hydrostatic pressure for well control and to minimize formation damage caused by fluid loss during perforating and other completion operations. Once the completion fluid is no longer needed down hole, the oil external-water internal emulsion completion fluid remaining in the well bore is inverted and reduced in viscosity by contacting the emulsion delivery fluid with an aqueous acid solution. The aqueous acid solution is comprised of water, an acid, an anionic sulfonate surfactant, and one or more of the chemicals described above for preventing the anionic sulfonate surfactant from reacting with the amine emulsifier after the emulsifier is made cationic by the acid. Thereafter, the remaining inverted water external-oil internal emulsion is removed from the subterranean formation.

To facilitate a better understanding of the present invention, the following examples of some of the preferred embodiments are given. In no way should such examples be read to limit the scope of the invention.

EXAMPLES

Example 1

An invertible oil external-water internal emulsion drilling fluid was prepared in the laboratory comprised of a mixture of olefins having in the range of from about 8 to about 24 carbon atoms, calcium containing brine, lime and a nonionic ethoxylated soya amine emulsifier. Aqueous acid solutions were also prepared comprised of a 15% by weight aqueous hydrochloric acid solution to which linear dodecylbenzene sulfonic acid was added in an amount of 0.8% by weight of the resulting acid solution (Acid Solution A) and a 15% by weight aqueous hydrochloric acid solution to which linear dodecylbenzene sulfonic acid was added in an amount of 1.2% by weight of the resulting solution (Acid Solution B).

Test portions of the acid solutions were added to test portions of the invertible oil external-water internal emulsion drilling fluid and the viscosities of the resulting test mixtures were measured using a Fann 35A viscometer at a shear rate of 511/sec. Thereafter, various portions of a mixture of ethoxylated rosin amines and a mixture of ethoxylated coco amines were added to test portions of the combined acid solution—emulsion drilling fluids and the viscosities of the resulting test mixtures were measured.

The components of the test mixtures utilizing the ethoxylated rosin amine, i.e., a mixture of 90% by weight hydroabietylamines ethoxylated with 11 moles of ethylene oxide per mole and 10% by weight non-ethoxylated hydroabietylamines (Hercules, Inc. "POLYRAD 1110™") and the results of the tests are given in Table I below. The components of the test mixtures utilizing the ethoxylated coco amine, i.e., a mixture of alkylamines, having from 8 to 18 carbon atoms ethoxylated with from 15 moles of ethylene oxide per mole (Akzo Noble "ETHOMEEN C-25™"). The results of the tests are given in Table II below.

TABLE I

Viscosities Of Aqueous Acid Solutions Containing Dodecylbenzene Sulfonic Acid/Invertible Oil External-Water Internal Emulsion Drilling Fluid Mixtures With Various Quantities Of Ethoxylated Rosin Amine

| Ethoxylated Rosin Amine[1] Added To Acid/Emulsion Drilling Fluid Mixture, % by volume | Viscosity[2] Of Acid Solution A[3]/Emulsion Drilling Fluid[4] Mixture Before And After Ethoxylated Rosin Amine Added, Centipoises | Viscosity[2] Of Acid Solution B[5]/Emulsion Drilling Fluid[4] Mixture Before And After Ethoxylated Rosin Amine Added, Centipoises |
|---|---|---|
| 0 | 450 | 410 |
| 0.5 | 260 | 300 |
| 1.0 | 20 | 200 |
| 1.5 | 15 | 15 |

[1]Mixture of 90% by weight hydroabietylamines ethoxylated with 11 moles of ethylene oxide per mole and 10% by weight non-ethoxylated hydroabietylamines (Hercules, Inc. "POLYRAD 1110 ™").
[2]Viscosity measured using a Fann 35A viscometer at a shear rate of 511/sec.
[3]% by weight hydrochloric acid solution to which linear dodecylbenzene sulfonic acid was added in an amount of 0.8% by weight of the resulting acid solution.
[4]Mixture of olefins having from 8 to 24 carbon atoms, calcium containing brine, lime and nonionic ethoxylated soya amine emulsifier.
[5]15% by weight aqueous hydrochloric acid solution to which linear dodecylbenzene sulfonic acid was added in an amount of 1.2% by weight of the resulting acid solution.

TABLE II

Viscosities Of Aqueous Acid Solutions Containing Dodecylbenzene Sulfonic Acid/Invertible Oil External-Water Internal Emulsion Drilling Fluid Mixtures With Various Quantities Of Ethoxylated Coco Amine

| Ethoxylated Coco Amine[1] Added To Acid/Emulsion Drilling Fluid Mixture, % by volume | Viscosity[2] Of Acid Solution A[3]/Emulsion Drilling Fluid[4] Mixture Before And After Ethoxylated Coco Amine Added, Centipoises | Viscosity[2] Of Acid Solution B[5]/Emulsion Drilling Fluid[4] Mixture Before And After Ethoxylated Coco Amine Added, Centipoises |
|---|---|---|
| 0 | 450 | 405 |
| 0.5 | 30 | 275 |
| 1.0 | 25 | 110 |
| 1.5 | 20 | 25 |

[1]Mixture of alkylamines having from 8 to 18 carbon atoms ethoxylated with from 15 moles of ethylene oxide per mole (Akzo Nobel "ETHOMEEN C-25 ™").
[2]Viscosity measured using a Fann 35A viscometer at a shear rate of 511/sec.
[3]15% by weight aqueous hydrochloric acid solution to which linear dodecylbenzene sulfonic acid was added in an amount of 0.8% by weight of the resulting acid solution.
[4]Mixture of olefins having from 8 to 24 carbon atoms, calcium containing brine, lime and nonionic ethoxylated soya amine emulsifier.
[5]15% by weight aqueous hydrochloric acid solution to which linear dodecylbenzene sulfonic acid was added in an amount of 1.2% by weight of the resulting acid solution.

From Table I and Table II, it can be seen that effective phase inversion takes place with the presence of the ethoxylated rosin or coco amines.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a subterranean formation comprising the steps of:
    providing a treatment fluid comprising an invertible oil external-water internal emulsion stabilized with a nonionic emulsifier;
    pumping the treatment fluid into a subterranean formation;
    providing an aqueous acid solution comprising an acid, an anionic sulfonate surfactant, and a chemical for preventing the anionic sulfonate surfactant from reacting with the nonionic emulsifier after the nonionic emulsifier is made cationic by the acid;
    contacting the invertible oil external-water internal emulsion with the aqueous acid solution to substantially invert the emulsion; and,
    substantially removing the inverted water external-oil internal emulsion from the subterranean formation.

2. The method of claim 1 wherein the nonionic emulsifier comprises a nonionic amine emulsifier, an ethoxylated soya amine emulsifier, or a combination thereof.

3. The method of claim 1 wherein the acid in the aqueous acid solution comprises hydrochloric acid.

4. The method of claim 1 wherein the acid is present in the aqueous acid solution in an amount sufficient to substantially invert the oil external-water internal emulsion.

5. The method of claim 1 wherein the acid in the aqueous acid solution is present in the aqueous acid solution in an amount in the range of from about 1% to about 36% by weight of water in the aqueous acid solution.

6. The method of claim 1 wherein the anionic sulfonate surfactant comprises a linear alkylbenzyl sulfonate, a linear dodecylbenzenesulfonate or dodecylbenzenesulfonic acid, a branched alkylbenzyl sulfonate, a branched dodecylbenzenesulfonate, a dodecylbenzenesulfonic acid, an alkyl diphenyloxide disulfonate, an alpha-olefin sulfonate, a sulfosuccinate, or a combination thereof.

7. The method of claim 1 wherein the anionic sulfonate surfactant is present in the aqueous acid solution in an amount sufficient to prevent crude oil sludging.

8. The method of claim 1 wherein the anionic sulfonate surfactant is present in the aqueous acid solution in an amount in the range of from about 0.1% to about 1.5% by weight of water in the aqueous acid solution.

9. The method of claim 1 wherein the chemical for preventing the anionic sulfonate surfactant from reacting with the nonionic emulsifier after the nonionic emulsifier is made cationic comprises an ethoxylated hydroabietylamine, an ethoxylated alkyl amine, or a combination thereof.

10. The method of claim 1 wherein the chemical for preventing the anionic sulfonate surfactant from reacting with the nonionic emulsifier after the nonionic emulsifier is made cationic by the acid is present the aqueous acid solution in an amount in the range of from about 0.1% to about 3.0% by weight of water in the aqueous acid solution.

11. A method of fracturing a subterranean formation comprising the step of:
inserting an invertible oil external-water internal emulsion fracturing fluid stabilized with a nonionic emulsifier into the subterranean formation at a pressure sufficient to create at least one fracture therein; and
providing an aqueous acid solution comprising an acid, an anionic sulfonate surfactant, and a chemical for preventing the anionic sulfonate surfactant from reacting with the nonionic emulsifier after the nonionic emulsifier is made cationic by the acid;
contacting the invertible oil external-water internal emulsion with the aqueous acid solution to substantially invert the emulsion; and,
substantially removing the inverted water external-oil internal emulsion from the subterranean formation.

12. The method of claim 11 wherein the nonionic emulsifier comprises a nonionic amine emulsifier, an ethoxylated soya amine emulsifier, or a combination thereof.

13. The method of claim 11 wherein the acid in the aqueous acid solution comprises hydrochloric acid.

14. The method of claim 11 wherein the acid is present in the aqueous acid solution in an amount sufficient to substantially invert the oil external-water internal emulsion.

15. The method of claim 11 wherein the acid in the aqueous acid solution is present in the aqueous acid solution in an amount in the range of from about 1% to about 36% by weight of water in the aqueous acid solution.

16. The method of claim 11 wherein the anionic sulfonate surfactant comprises a linear alkylbenzyl sulfonate, a linear dodecylbenzenesulfonate or dodecylbenzenesulfonic acid, a branched alkylbenzyl sulfonate, a branched dodecylbenzenesulfonate, a dodecylbenzenesulfonic acid, an alkyl diphenyloxide disulfonate, an alpha-olefin sulfonate, a sulfosuccinate, or a combination thereof.

17. The method of claim 11 wherein the anionic sulfonate surfactant is present in the aqueous acid solution in an amount sufficient to prevent crude oil sludging.

18. The method of claim 11 wherein the anionic sulfonate surfactant is present in the aqueous acid solution in an amount in the range of from about 0.1% to about 1.5% by weight of water in the aqueous acid solution.

19. The method of claim 11 wherein the chemical for preventing the anionic sulfonate surfactant from reacting with the nonionic emulsifier after the nonionic emulsifier is made cationic comprises an ethoxylated hydroabietylamine, an ethoxylated alkyl amine, or a combination thereof.

20. The method of claim 11 wherein the chemical for preventing the anionic sulfonate surfactant from reacting with the nonionic emulsifier after the nonionic emulsifier is made cationic by the acid is present the aqueous acid solution in an amount in the range of from about 0.1% to about 3.0% by weight of water in the aqueous acid solution.

21. The method of claim 11 wherein the invertible oil external-water internal emulsion fracturing fluid further comprises a proppant.

22. A method of installing a gravel pack comprising the steps of:
providing a gravel pack composition comprising gravel particles and an invertible oil external-water internal emulsion delivery fluid stabilized with a nonionic emulsifier;
introducing the gravel pack composition to the well bore so that the gravel particles form a gravel pack substantially adjacent to the wellbore;
providing an aqueous acid solution comprising an acid, an anionic sulfonate surfactant, and a chemical for preventing the anionic sulfonate surfactant from reacting with the nonionic emulsifier after the nonionic emulsifier is made cationic by the acid;
contacting the invertible oil external-water internal emulsion with the aqueous acid solution to substantially invert the emulsion; and,
substantially removing the inverted water external-oil internal emulsion from the subterranean formation.

23. The method of claim 22 wherein the nonionic emulsifier comprises a nonionic amine emulsifier, an ethoxylated soya amine emulsifier, or a combination thereof.

24. The method of claim 22 wherein the acid in the aqueous acid solution comprises hydrochloric acid.

25. The method of claim 22 wherein the acid is present in the aqueous acid solution in an amount sufficient to substantially invert the oil external-water internal emulsion.

26. The method of claim 22 wherein the acid in the aqueous acid solution is present in the aqueous acid solution in an amount in the range of from about 1% to about 36% by weight of water in the aqueous acid solution.

27. The method of claim 22 wherein the anionic sulfonate surfactant comprises a linear alkylbenzyl sulfonate, a linear dodecylbenzenesulfonate or dodecylbenzenesulfonic acid, a branched alkylbenzyl sulfonate, a branched dodecylbenzenesulfonate, a dodecylbenzenesulfonic acid, an alkyl diphenyloxide disulfonate, an alpha-olefin sulfonate, a sulfosuccinate, or a combination thereof.

28. The method of claim 22 wherein the anionic sulfonate surfactant is present in the aqueous acid solution in an amount sufficient to prevent crude oil sludging.

29. The method of claim 22 wherein the anionic sulfonate surfactant is present in the aqueous acid solution in an amount in the range of from about 0.1% to about 1.5% by weight of water in the aqueous acid solution.

30. The method of claim 22 wherein the chemical for preventing the anionic sulfonate surfactant from reacting with the nonionic emulsifier after the nonionic emulsifier is made cationic comprises an ethoxylated hydroabietylamine, an ethoxylated alkyl amine, or a combination thereof.

31. The method of claim 22 wherein the chemical for preventing the anionic sulfonate surfactant from reacting with the nonionic emulsifier after the nonionic emulsifier is made cationic by the acid is present the aqueous acid solution in an amount in the range of from about 0.1% to about 3.0% by weight of water in the aqueous acid solution.

32. A completion method comprising the steps of:
providing a completion fluid comprising an invertible oil external-water internal emulsion delivery fluid stabilized with a nonionic emulsifier;
introducing the completion fluid to a well bore so as to substantially fill at least a section of the well bore;
providing an aqueous acid solution comprising an acid, an anionic sulfonate surfactant, and a chemical for preventing the anionic sulfonate surfactant from reacting with the nonionic emulsifier after the nonionic emulsifier is made cationic by the acid;
contacting the invertible oil external-water internal emulsion with the aqueous acid solution to substantially invert the emulsion; and,
substantially removing the inverted water external-oil internal emulsion from the well bore.

33. The method of claim 32 wherein the nonionic emulsifier comprises a nonionic amine emulsifier, an ethoxylated soya amine emulsifier, or a combination thereof.

34. The method of claim 32 wherein the acid in the aqueous acid solution comprises hydrochloric acid.

35. The method of claim 32 wherein the acid is present in the aqueous acid solution in an amount sufficient to substantially invert the oil external-water internal emulsion.

36. The method of claim 32 wherein the acid in the aqueous acid solution is present in the aqueous acid solution in an amount in the range of from about 1% to about 36% by weight of water in the aqueous acid solution.

37. The method of claim 32 wherein the anionic sulfonate surfactant comprises a linear alkylbenzyl sulfonate, a linear dodecylbenzenesulfonate or dodecylbenzenesulfonic acid, a branched alkylbenzyl sulfonate, a branched dodecylbenzenesulfonate, a dodecylbenzenesulfonic acid, an alkyl diphenyloxide disulfonate, an alpha-olefin sulfonate, a sulfosuccinate, or a combination thereof.

38. The method of claim 32 wherein the anionic sulfonate surfactant is present in the aqueous acid solution in an amount sufficient to prevent crude oil sludging.

39. The method of claim 32 wherein the anionic sulfonate surfactant is present in the aqueous acid solution in an amount in the range of from about 0.1% to about 1.5% by weight of water in the aqueous acid solution.

40. The method of claim 32 wherein the chemical for preventing the anionic sulfonate surfactant from reacting with the nonionic emulsifier after the nonionic emulsifier is made cationic comprises an ethoxylated hydroabietylamine, an ethoxylated alkyl amine, or a combination thereof.

41. The method of claim 32 wherein the chemical for preventing the anionic sulfonate surfactant from reacting with the nonionic emulsifier after the nonionic emulsifier is made cationic by the acid is present the aqueous acid solution in an amount in the range of from about 0.1% to about 3.0% by weight of water in the aqueous acid solution.

* * * * *